UNITED STATES PATENT OFFICE.

JOHN W. HASBURG, OF CHICAGO, ILLINOIS.

METHOD OF STAINING GLAZED CERAMIC WARE.

1,334,301.  Specification of Letters Patent.  Patented Mar. 23, 1920.

Application filed February 2, 1920. Serial No. 355,614.

*To all whom it may concern:*

Be it known that I, JOHN W. HASBURG, a citizen of the United States, residing at Chicago, in the county of Cook and State of Illinois, have invented a certain new and useful Improvement in Methods of Staining Glazed Ceramic Ware, and declare the following to be a full, clear, and exact description of the same, such as will enable others skilled in the art to which it pertains to make and use the same, reference being had to the accompanying drawings, which form a part of this specification.

Some kinds of glazed ceramic ware are susceptible of being decorated by fire coloring or staining while other kinds cannot be decorated in this way. Ware which is intended afterward to be stained can of course be manufactured in such a way that it will take the stain. However, much of the ware that is found in the market and which it may be desired to stain will be found not adapted to ordinary staining processes.

The object of the present invention is to produce a simple and novel method of staining glazed ceramic ware which cannot be stained by or which it is difficult or impracticable to stain by ordinary processes.

In carrying out my invention I first apply to the piece of glazed ceramic ware, to which I shall hereafter refer by the general name of glazed ware, a glaze which will take a stain, and then apply to this auxiliary glaze metallic salts or bases mixed with clayey material and burn the ware to develop the color by fire in the usual way.

The simplest course to pursue is to select a piece of glass or glaze which by experiment shows that it is suited for the purpose intended and then grind up a quantity thereof until it is very fine; the finely divided material being then applied in any suitable way to the surface of the ware to be treated. After the secondary or auxiliary glaze has been fired or burned on the staining may be carried out in any suitable way as, for example, as in the manner described in my Patent No. 1,328,833 dated January 27, 1920.

I have illustrated my invention in a general way in the accompanying drawing, wherein:

Figure 1 is an elevation of a piece of ware which has been prepared and stained in accordance with the present invention.

Fig. 2 is a section on a greatly enlarged scale through one of the walls of the piece of ware before the final staining operation;

Fig. 3 is a view similar to Fig. 2 illustrating a condition after the stain has been applied;

Fig. 4 is a section similar to Fig. 2, showing a modification; and

Fig. 5 is a view similar to Fig. 4, illustrating the condition after the stain has been applied.

It will of course be understood that the secondary or auxiliary glaze may be applied to the whole surface or to only a part thereof, depending upon the nature and extent of the decorations desired. Furthermore, if the secondary or auxiliary glaze is applied only to a part of the surface of a piece of ware to be stained, it may be given the exact contour of the decoration desired so that the staining material may be applied quickly and without careful or painstaking effort and will stain only on the part treated with the secondary glaze.

Referring to Fig. 2 of the drawing, 1 represents the body of the ware which, in the arrangement shown, is covered with a glaze as indicated at 2; the glaze being assumed to be of a kind which will not take a stain or which it may be difficult or impracticable to stain. As heretofore explained, I prepare material for an auxiliary or secondary glaze which is applied to the ware and fired so as to produce an auxiliary layer, 3, which may be assumed to extend over the whole outer surface of the ware. If it be not desired to reglaze the entire surface it may be glazed only in part, for example as illustrated at 4 in Fig. 4.

The secondary or auxiliary glaze being of the kind which is adapted to be stained, the staining process is then carried out in any usual or suitable way, the result being either as illustrated in Fig. 3 where the coloring material, 5, has penetrated into the glaze, 3, which covers a larger area than the colored or stained portion; or where the coloring material, 6, has penetrated the glaze, 4, co-extensive in area with the staining or coloring, as shown in Fig. 5.

It will of course be understood that the drawing and the particular description thereof are only intended to explain several ways in which my invention may be practised. I intend to cover broadly the process and the product produced thereby as will be apparent from the definitions of my invention constituting the appended claims.

I claim:

1. The process of coloring glazed ceramic ware in which the glaze is unsuitable for fire staining which consists in first firing or burning thereon a secondary glaze adapted to be stained, and then staining the secondary glaze.

2. The process of coloring glazed ceramic ware in which the glaze is not adapted to be stained which consists in applying to the ware a material adapted, when fired, to produce a glaze capable of being stained, firing the applied material to produce a secondary glaze, and then staining the secondary glaze.

3. The step in the process of coloring glazed ceramic ware in which the glaze is not adapted to be stained which consists in preparing the ware to receive staining by forming on the ware a secondary glaze adapted to be stained.

4. An article of manufacture comprising a piece of glazed ceramic ware having thereon a secondary glaze of a character adapted to be stained.

5. An article of manufacture comprising a piece of glazed ware having thereon a stained secondary glaze.

In testimony whereof, I sign this specification.

JOHN W. HASBURG.